UNITED STATES PATENT OFFICE 2,360,042

NICOTINE-BASIC METALLIC SALT INSECTICIDES AND PROCESS OF MAKING THEM

Frederick E. Dearborn, Washington, D. C.

No Drawing. Application May 19, 1941,
Serial No. 394,143

5 Claims. (Cl. 260—291)

This invention relates to an alkaloidal insecticide and fungicide dust and spray, to a composition of matter for making the same, and to a process for making such composition.

The object of this invention is to develop an improved, combined insecticide and fungicide containing a vegetable alkaloid as the principal active toxic ingredient which may be applied to vegetation either as a dust or as a spray.

Another object is to increase the toxic action of the alkaloid by chemically combining the alkaloid with a metallic salt.

Another object is to produce a combined insecticide and fungicide containing a vegetable alkaloid chemically combined with a metallic salt and a hydrophilic clay, the product being non-photocidal to vegetation when applied as a dust or as a spray.

Still another object is to stabilize the vegetable alkaloid against the destructive action of sunlight.

It is well known that certain vegetable alkaloids, such as nicotine, are highly efficient insecticides, both as a contact and as a stomach poison, and that they also act as a fumigant when in the vapor state. However, they do not possess any fungicidal properties. Among the defects of nicotine bentonite, nicotine tannate, etc., are the lack of fungicidal properties, and the fact that the nicotine is not stabilized against the destructive action of sunlight which renders it ineffective in a relatively short time, necessitating frequent applications in order to control insects. It is well known that ultra-violet and the visible short wave length rays in sunlight readily oxidize or otherwise reduce the toxicity of unprotected vegetable alkaloids in a short time. In this invention the vegetable alkaloids are stabilized against the destructive action of sunlight by being chemically combined with a suitable metallic salt which protects it from the destructive effects of sunlight. The destructive rays of the sun are blocked by the metallic salt or otherwise prevented from acting on the vegetable alkaloid, thus prolonging their usefulness as an insecticide. Most vegetable alkaloids combine with the salts of copper, zinc, mercury, and other metals to form complex salts (see Compt. Rend. Acad. Sci. (Paris) 14: 224, 226, 1842). The toxicity of the vegetable alkaloids, both as a contact and as a stomach poison, are appreciably increased when in chemical combination with certain metallic salts which has been shown by tests made against the cockroach and the codling moth larvae.

Copper in numerous insoluble or slightly soluble compounds has long been recognized as a highly efficient fungicide and has been extensively used. Recently, zinc compounds have been used effectively against certain fungi. Mercury compounds are well known bactericides and fungicides and have been extensively used. But the composition of matter, as well as the method of chemically combining these metallic salts with a vegetable alkaloid and a hydrophilic clay, is new and novel. A combined insecticide and fungicide is produced in which the toxicity of the vegetable alkaloid, both as a contact and as a stomach poison to insects is appreciably increased; the vegetable alkaloid is stabilized against the destructive action of sunlight, and the product is non-photocidal to vegetation. When a nicotine preparation, such as nicotine bentonite, is mechanically mixed with a copper fungicide and applied to vegetation, either as a dust or as a spray, the toxicity of the mixture to insects is invariably reduced and considerable foliage injury results, as was shown when applied to apple tree foliage in tests conducted against the codling moth.

Nicotine is not the only vegetable alkaloid or compound that may be used in preparing my new composition of matter, as other chemically related compounds may be used, such as pyrole, pyridine, piperidines, piperazines, pyrrolidines, strychnine, quinine, benzolmetanicotine, neonicotine, coniine, anabasine, sulfurized nicotine, etc.

In its broadest embodiment, the process of making my new insecticidal and fungicidal composition of matter consists of first reacting a vegetable alkaloid, such as nicotine or nicotine sulphate, with a solution of a metallic salt capable of forming complex salts with it. Heating from about 50 to 100° C. is generally required to bring about complete reaction. Salts of the heavy metals, such as the salts of copper, zinc, mercury, etc., may be employed. Then the alkaloid-metal salt complex is reacted with a water suspension of a hydrophilic clay, such as bentonite, by heating from 80 to 100° C., or boiling to bring about the desired reaction. The reaction product is filtered, washed, dried and ground to a very fine powder, which may be used as a dust or as a spray when suspended in water.

When a vegetable alkaloid, such as nicotine, is reacted with a metallic salt, a complex alkaloidal basic salt is probably formed as most alkaloids are basic in character. To illustrate, when nicotine reacts with copper sulphate, the following probable reaction takes place:

(1) $C_{10}H_{14}N_2 + CuSO_4 + H_2O =$

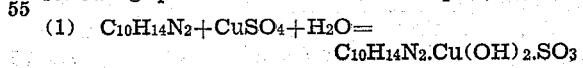
$C_{10}H_{14}N_2.Cu(OH)_2.SO_3$

The above compound theoretically contains 47.7% of nicotine and 18.7% of copper. In the literature a copper-nicotine complex of the following formula is described:

(2) Cu(C₅H₄N.C₅H₁₀N)₄
(Chem. abs. vol. 25, pp. 4484.)

This compound theoretically contains 8.9% of copper, and the remainder is nicotine.

It has been found that when a hydrophilic clay, such as a Wyoming bentonite, is boiled in an excess of a solution of copper sulphate, 2.5% of copper is chemically combined with the bentonite. However, when the bentonite is similarly boiled with a nicotine-copper salt complex, 5.2% of copper is chemically combined, together with 13.4% of nicotine after washing the product six times, each time in a large amount of fresh water. This shows that the bentonite combines with the nicotine-copper salt complex and not with the nicotine alone, when a nicotine-copper salt complex is present. In Equation 1 above, the ratio of nicotine to copper in the complex compound is 2.55, which approximates very closely the value obtained for that on the washed product described above. This is additional proof that the bentonite combines with the nicotine-copper salt complex just described. In order to increase the metallic content in the product an excess of the metal salt is used over that which will combine with the alkaloid, and the excess metal precipitated by the addition of an alkali hydroxide, carbonate or bicarbonate. It will be evident from the foregoing that a product can be made containing only a small amount of metallic salt, or a larger amount, as desired, for fungicidal purposes.

Within certain limits, the toxicity of the alkaloid is increased with an increase in the metal content.

When an alkali hydroxide is used as the precipitating agent, a more gelatinous product is obtained than when an alkali carbonate or bicarbonate is used. The former product requires a longer time to filter and dries to a hard mass while the latter product filters more readily and does not form cakes on drying. Irrespective of the precipitant used, the product should be ground to a very fine powder before using.

The precipitated metallic salt evidently combines chemically with the hydrophilic clay as the product is rendered insoluble in water and is non-photocidal to vegetation as shown by experimental tests. The metal or metallic salt evidently replaces part or all of the aluminum in the hydrophilic clay. This is shown by boiling bentonite with a nicotine-copper salt complex, in which the copper salt is in excess of the amount required to combine with the nicotine, and the excess metal precipitated by the addition of an alkali hydroxide, carbonate, or bicarbonate to neutrality or very slightly alkaline to red litmus paper. The filtrate from this product is treated with ammonium hydroxide, and a voluminous precipitate of aluminum hydroxide is thrown down. This shows that the metal or metal salts chemically combine with the hydrophilic clay and are rendered insoluble. This holds true only for the metals or metallic salts which are lower in the electromotive series of metals than aluminum. All of the new compositions of matter, after drying and grinding, are fluffy powders and are readily suspended in water, producing a sprayable suspension. The hydrophilic clay-vegetable alkaloid-metal salt complex does not readily hydrolyze in water as shown when a complex containing copper, zinc, or mercury is allowed to stand for 24 hours in water with hourly shakings and the filtrate tested with diethyl dithiocarbamate, only a slight trace of the metals are obtained.

The toxicity to insects of the new compositions of matter are increased by being chemically combined with a metallic salt. This is shown, for example, when a dried and ground bentonite-nicotine-copper salt complex, containing 11.4% of nicotine and 14% of metallic copper, was applied to apple tree foliage at the rate of 4 pounds of the insecticide to 100 gallons of water, an efficiency of 98% was obtained against the codling moth larvae. This is at the rate of 0.456 pounds of nicotine per 100 gallons of water. In the tax mixed nicotine bentonite one pint of nicotine sulphate (50% of nicotine) is generally used. The amount of nicotine actually used in this case is considerably more than for my new bentonite-nicotine-copper salt complex, and the efficiency is not as great against the codling moth larvae, as has been shown by numerous experiments.

The following examples are given to illustrate my invention:

*Example 1.*—(a) To prepare 100 grams of an insecticide and fungicide containing 10% of nicotine and 18% of copper, the following materials are required:

| | Grams |
|---|---|
| Nicotine (95%) | 11 |
| Copper sulphate (CuSO₄.5H₂O) | 70 |
| Bentonite | 75 |
| Sodium hydroxide (NaOH) | 22 |

The nicotine is first reacted with the copper sulphate solution by heating between 50 to 100° C. to form the nicotine-copper salt complex. Additional water is added to the reactants and then the bentonite is added with agitation. The excess copper is precipitated by adding dilute soduim hydroxide solution slowly with vigorous agitation. When all of the alkali has been added the reactants should be just neutral, if not adjustments should be made. The reactants are heated to boiling with agitation, then filtered and dried. The product dries to a hard mass which requires grinding to a fine powder before use as an insecticide. The product has a light-green color and is readily suspended in water, forming a good suspension. The per cent of both nicotine and copper may be varied. The maximum per cent of nicotine that a washed product will contain will range around 16% of nicotine. The copper content, of course, may be varied over a much wider range, depending upon the excess copper salt that is used in the preparation of the composition of matter. The copper content need not be more than sufficient to stabilize the product, or a larger amount, depending upon the type of insecticide and fungicide that is desired. Enough of the metal salt should be used to stabilize the nicotine and to increase its toxicity.

(b) To prepare 100 grams of an insecticide and fungicide containing 5% of quinine and 18% of copper, the following materials are required.

| | Grams |
|---|---|
| Quinine sulphate (C₂₀H₂₄O₂N₂)₂.H₂SO₄.2H₂O | 6.1 |
| Copper sulphate (CuSO₄.5H₂O) | 70 |
| Bentonite | 70 |
| Sodium hydroxide | 22 |

The quinine compound is prepared in the same manner as was the copper compound.

(c) To prepare 100 grams of an insecticide and fungicide containing 5% of strychnine and 18% of copper, the following materials are required:

| | Grams |
|---|---|
| Strychnine sulphate | 6.5 |
| Copper sulphate ($CuSO_4.5H_2O$) | 70 |
| Bentonite | 70 |
| Sodium hydroxide | 22 |

This composition of matter is prepared in the same way as the nicotine compound described under 1 (a). The wet material is a gelatinous mass, drying to a hard cake which requires grinding. The dried and ground material is of a bluish-green in color. In fact, all of the alkaloid copper compounds are of a bluish-green color, some slightly darker than others.

Example 2.—(a) To prepare 100 grams of an insecticide and fungicide containing 14% of nicotine and 14% of zinc, the following materials are required:

| | Grams |
|---|---|
| Nicotine (95%) | 15 |
| Zinc sulphate ($ZnSO_4$) | 35 |
| Bentonite | 70 |
| Sodium carbonate ($N_2CO_3$) | 22 |

The same procedure is used in preparing this composition of matter as was used under 1 (a). The product does not become gelatinous on boiling and filters easily, drying to a powder. However, the product should be ground finer before using. It is of a cream to white color.

(b) To prepare 100 grams of an insecticide and fungicide containing 7% of quinine and 14% of zinc, the following materials are required:

| | Grams |
|---|---|
| Quinine sulphate | 9 |
| Zinc sulphate ($ZnSO_4$) | 35 |
| Bentonite | 70 |
| Sodium carbonate ($Na_2CO_3$) | 22 |

The process of manufacturing this composition of matter is the same as described under 1 (a) above. The product has a white to a cream color. It filters easily and on drying behaves the same as the material described under 2 (a) above.

(c) To prepare 100 grams of an insecticide and fungicide containing 7% of strychnine and 14% of zinc, the following materials are required:

| | Grams |
|---|---|
| Strychnine (100%) | 7 |
| Zinc sulphate ($ZnSO_4$) | 35 |
| Bentonite | 70 |
| Sodium carbonate ($NaCO_3$) | 22 |

The same process of manufacture is used as is described under 1 (a) above. All of the zinc preparations are of the same color. This preparation filtered easily and dried to a powder.

Example 3.—(a) To prepare 100 grams of an insecticide and fungicide containing 5% of mercury and 14% of nicotine, the following materials are required:

| | Grams |
|---|---|
| Nicotine (95%) | 15 |
| Mercuric acetate | 8 |
| Bentonite | 80 |
| Sodium bicarbonate ($NaHCO_3$) | 5 |

The same procedure as outlined under 1 (a) above is used in the preparation of this composition of matter. The precipitated product is somewhat more gelatinous than those described under 2 (a), 2 (b), and 2 (c). The product has an orange color and dries in cakes which are easily broken up.

(b) To prepare 100 grams of an insecticide and fungicide containing 5% of mercury and 7% of quinine, the following materials are required:

| | Grams |
|---|---|
| Quinine | 7 |
| Mercuric acetate | 8 |
| Bentonite | 90 |
| Sodium bicarbonate | 5 |

The same method of manufacture as is used under 1 (a) above is used in the preparation of this compound. The precipitated product resembles that obtained in 3 (a) above in color. This product does not filter as easily as those described under Example 2.

(c) To prepare 100 grams of an insecticide and fungicide containing 5% of mercury and 7% of strychnine, the following materials are required:

| | Grams |
|---|---|
| Strychnine | 7 |
| Mercuric acetate | 8 |
| Bentonite | 90 |
| Sodium bicarbonate | 5 |

A product similar to the other ones described under Example 3 (a) and 3 (b) is obtained, having an orange color and more gelatinous than the products described under Example 2.

Having described the nature of my new compositions of matter, their method of preparation, and uses, what I claim is:

1. A process of manufacturing a combined insecticide and fungicide which consists of first forming the vegetable alkaloid-basic metallic salt complex by heating a solution of the vegetable alkaloid with a solution of a metallic salt, in the proper proportions, at a temperature of 50 to 100° C.; then chemically reacting the complex with a hydrophilic clay at a temperature of approximately 100° C.; adding the desired excess of the metallic salt solution, but equivalent to not more than 35% by weight of the metal; precipitating the excess metal by the addition of a solution of a fixed alkali of the group consisting of alkali hydroxide, carbonate, and bicarbonate; heating the product at 100° C. until the excess metal has replaced the aluminum in the hydrophilic clay.

2. A product comprising a vegetable alkaloid-basic metallic salt complex chemically combined with a hydrophilic clay in which the aluminum has been substituted in a substantial amount by a metal of the group consisting of metals lower in the electromotive series than aluminum.

3. A product comprising a nicotine-basic copper salt complex chemically combined with bentonite in which the aluminum has been replaced in a substantial amount by copper.

4. A product comprising a nicotine-basic zinc salt complex chemically combined with bentonite in which the aluminum has been replaced in a substantial amount by zinc.

5. A product comprising a nicotine-basic mercury salt complex chemically combined with bentonite in which the aluminum has been replaced in a substantial amount by mercury.

FREDERICK E. DEARBORN.